United States Patent Office 2,806,023
Patented Sept. 10, 1957

2,806,023

IMPROVED INDICATOR DYES

Henry Wenker, Bradenton Beach, Fla.

No Drawing. Application March 1, 1957,
Serial No. 643,220

8 Claims. (Cl. 260—200)

This application is a continuation-in-part of application Serial No. 557,453, filed January 5, 1956, now abandoned.

This invention relates to, and has for its object the provision of, new azo dyes, and the method of producing them.

The compounds of this invention comprise a member of the group consisting of azo dyes of the general formula

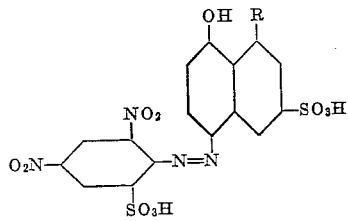

and alkali salts thereof (including such soluble salts as alkaline-earth metal salts and especially alkali-metal salts) wherein R is a member of the group consisting of sulfonic, sulfamide, N-(benzyl)substituted sulfamide and N-(lower alkyl)-substituted sulfamide groups. The preferred compounds are those wherein R is a sulfonic group.

Since the new azo dyes of this invention are sensitive to alkali (or acid) they are particularly useful in the production of indicator papers, i. e. papers (or equivalent carrier materials) into which the new compounds of this invention have been incorporated and which give visible indication of an environmental change in hydrogen ion concentration. Thus, for example, filter paper impregnated with the potassium salt of 4-(2,4-dinitro-6-sulfonic-phenyl azo)-1-naphthol-6,8-disulfonic acid shows a change from the original color to a significant color (indicating the pH) in solutions used in chemical, biological and clinical procedures.

The new dyestuffs are prepared by the method which essentially comprises coupling in an acid solution, equimolecular quantities of diazo-2,4-dinitrobenzene-6-sulfonic acid with a compound (I) of the class consisting of naphthols of the general formula

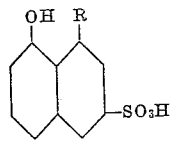

wherein R has the meaning given hereinbefore; and recovering the reaction product. Thus, the following compounds (I) may be used in the preparation of the compounds of the invention: 1-naphthol-6,8-disulfonic acid; 1-naphthol-8-sulfamide-6-sulfonic acid; 1-naphthol-8-methylamino sulfonyl-6-sulfonic acid; 1-naphthol-8-ethylamino sulfonyl-6-sulfonic acid; 1-naphthol-8-propylamino sulfonyl-6-sulfonic acid; 1-naphthol-8-benzylamino sulfonyl-6-sulfonic acid.

In preparing the dyestuff of this invention the reactants may also be employed in the alkali salt form (for example, as alkali-metal salts such as the potassium, sodium, and including ammonium salts thereof); and the resulting dye is obtained having one or more of the sulfonic acid groups neutralized by the alkali group.

Alkali metal salts of the new dyestuffs in the dry and pulverized state constitute red or brown powders soluble in water giving green solutions which change upon the addition of alkali, to clear blue free from violet overtones, and upon the addition of acids, to clear yellow, free from orange or red overtones. They yield upon reduction with stannous chloride and hydrochloric acid 1,2,4-triamino-benzene-6-sulfonic acid and R substituted-amido-naphthol-sulfonic acid.

The new dyes are unsuitable for ordinary dyeing purposes due to their sensitivity to acids and alkalis. However the compounds of the invention have excellent properties as indicators, which make them eminently suitable for the purpose of determining the hydrogen ion concentration of solutions. Because of sharp differentiation even with a small difference in pH value the new dyes are especially useful as pH indicators not only in chemical laboratories but especially also in the field of medicine, e. g. for the accurate determination of the pH values of samples of urine.

The colors of the dyes in solution as well as in the form of test papers (cf. preparation of indicator paper hereinafter) are of a purity and intensity which cannot be attained by other indicators. The outstanding superiority of the compounds of this invention is particularly unexpected since over 150 closely-related compounds have proven to be quite unsuitable or inferior as indicators. Thus, when diazotized 4-sulfonic-2,6-dinitroaniline is employed as the diazo component, in place of diazotized 2,4-dinitro aniline-6-sulfonic acid, the resultant compound is unsatisfactory as an indicator. Similarly, when a 2-naphthol sulfonic acid is employed as the azo component, (in place of a 1-naphthol-sulfonic acid), the resultant dye does not give a tri-color producing indicator. For example, the dye, 1-(2,4-dinitro-6-sulfonic phenylazo)-2-naphthol-6,8-disulfonic acid salt gives a slightly dull orange acid color, and in alkaline, a gray-blue color.

The following examples are illustrative, but by no means limitative of the invention (the parts are by weight; and the temperature is in degrees centigrade).

EXAMPLE 1

4-(2,4-dinitro-6-sulfonic phenyl azo)-1-naphthol-6,8-disulfonic acid, potassium salt 30.1 parts of the potassium salt of 2,4-dinitroaniline-6-sulfonic acid are diazotized by dissolving in 300 parts of concentrated sulfuric acid and adding 6.9 parts of sodium nitrite. The solution of diazo-2,4-dinitrobenzene-6-sulfonic acid thus obtained is allowed to run slowly into a solution of 30.4 parts of 1-naphthol-6,8-disulfonic acid (prepared for example as described in German Patent 75,084, 83,146 or 82,563) in 300 parts of water in the presence of 600 parts of ice. After 1 hour the dye is salted out by the addition of potassium sulfate (about 90 parts), and the dyestuff filtered, washed with a potassium sulfate solution, pressed and dried. The new dyestuff thus obtained, in the form of its potassium salt, corresponds with the following formula:

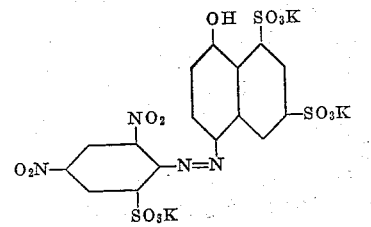

In the dry and pulverized state the latter is a brown powder soluble in water with a green color, and soluble in concentrated sulfuric acid with a purple color. Upon reduction with stannous chloride and hydrochloric acid it yields 1,2,4-triaminobenzene-6-sulfonic acid and 4-amino-1-naphthol-6,8-disulfonic acid.

Using a molar equivalent of sodium chloride in place of potassium sulfate in Example 1 yields the corresponding product in the sodium salt form.

PREPARATION OF AN INDICATOR PAPER

Filter paper is impregnated with a 0.2% aqueous solution of 4-(2,4-dinitro-6-sulfonic phenylazo)-1-naphthol-6,8-disulfonic acid (prepared as described in Example 1) and carefully dried. The paper is impregnated with a neutral aqueous solution containing 0.66% of the sulfonium product, described in German Patent 661,749, and again dried. The resultant indicator paper being the subject of my copending application, Serial No. 591,023, filed June 13, 1956, and entitled "Indicator Papers."

Clinically this indicator paper can be used in the same general way as phenaphthazine paper to determine the pH (of urinary, vaginal, ocular, nasal and salivary secretions for example)—with however outstandingly superior results. It is also used in soil pH determinations and other nonclinical application.

The paper is capable of giving clear differentiation between pH 4 and below, 5, 6, 7, 8, 9 and 10 almost instantaneously. Specifically the color response at the respective pH, using for example McIlvaine universal buffers, is as follows:

| pH | Color |
| --- | --- |
| pH 4.0 or below | yellow. |
| 5.0 | yellow-green. |
| 6.0 | light green. |
| 7.0 | dark green. |
| 8.0 or above | dark blue. |

EXAMPLE 2

4-(2,4-dinitro-6-sulfonic phenylazo)-1-naphthol-8 sulfonamido-6-sulfonic acid, potassium salt 30.1 parts of the potassium salt of 2,4-dinitroaniline-6-sulfonic acid are diazotized as in Example 1 and the diazo solution is combined with a solution of 1-naphthol-8-sulfamido-6-sulfonic acid. (The latter is obtained by treating 30.8 parts of the sodium salt of 1,8-naphthosultone-6-sulfonic acid of the formula:

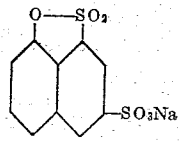

with 30 parts of aqueous concentrated ammonia at room temperature, neutralizing the excess of ammonia with dilute sulfuric acid and adding 600 parts of ice and 150 parts of water.) After 1 hour the new dyestuff is salted out by the addition of potassium sulfate, and the dyestuff filtered, washed with a potassium sulfate solution, pressed and dried. The new dyestuff thus obtained, in the form of its neutral potassium salt, corresponds with the formula:

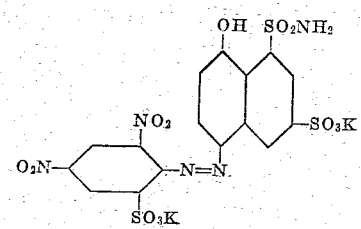

The latter in the dry pulverized state is a red powder soluble in water with a green color, soluble in concentrated sulfuric acid with a purple color. Upon reduction with stannous chloride and hydrochloric acid it yields 1,2,4-triaminobenzene-6-sulfonic acid and 1-naphthol-4-amido-8-sulfamido-6-sulfonic acid.

EXAMPLE 3

4-(2,4-dinitro-6-sulfonic phenylazo)-1-naphthol-8-(N-methyl sulfonamido)-6-sulfonic acid, sodium salt 30.1 parts of the potassium salt of 2,4-dinitroaniline-6-sulfonic acid are diazotized as in Example 1 and the diazo solution is combined with a solution of 1-naphthol-8-N-methylsulfamido-6-sulfonic acid. (The latter is obtained by treating 30.8 parts of the sodium salt of 1,8-naphthosultone-6-sulfonic acid with 60 parts of a 25% aqueous solution of methylamine at room temperature for 12 hours, neutralizing the excess of methylamine with dilute sulfuric acid and adding 600 parts of ice.) After 1 hour the new dyestuff is salted out by the addition of salt (about 150 parts), and the dyestuff filtered, washed with salt solution, pressed and dried. The product thus obtained, in the form of its neutral sodium salt, corresponds with the formula:

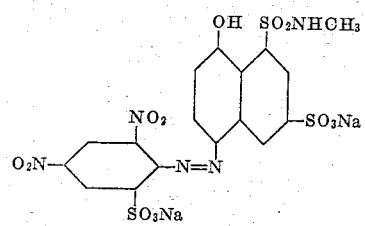

In the dry and pulverized state it is a brown powder soluble in water with a green color, and soluble in concentrated sulfuric acid with a purple color. Upon reduction with stannous chloride and hydrochloric acid it yields 1,2,4-triaminobenzene-6-sulfonic acid and 1-naphthol-4-amido-8-N-(methyl)sulfamide-6-sulfonic acid.

EXAMPLE 4

4-(2,4-dinitro-6-sulfonic phenyl azo)-1-naphthol-6,8-disulfonic acid, potassium salt

*Diazotation.*—29.7 g. of finely powdered dry 2,4-dinitroaniline-6-sulfonic acid sodium salt, prepared as described in Example 1, that is .1 mol, suspended in 300 cc. glacial acetic acid, and 70 cc. of nitrosylsulfuric acid are added slowly; the temperature should be kept below 30° by cooling. After stirring for 1 hour the solution becomes clear except for a small amount of inorganic salt. This diazo solution is quite stable at room temperature.

*Coupling.*—.11 mol of naphthosulton-6-sulfonic acid are converted into 1-naphthol-6,8-disulfonic acid, neutralized with dilute sulfuric acid, diluted to 400 cc. with water and an excess of ice is added. The diazo solution is then run slowly into it with good agitation. Coupling takes place rapidly; after a short time, 5% of potassium sulfate, based on the volume of the liquid, is added to the clear, deep orange colored solution and after 2 hours the precipitated dye is filtered, washed on the filter with a 5% potassium sulfate solution which is slightly acidified with acetic acid, and dried at 70–80°. It may be washed on the filter with acetone in order to remove most of the potassium sulfate dissolved in the wash liquor. The product, 4-(2,4-dinitro-6-sulfonic-phenyl azo)-1-naphthol-6,8-disulfonic acid, potassium salt, is in the form of orange crystals, fairly soluble in water, less so in methanol, insoluble in acetone. It comes out very pure and is ready for use.

The filtrate which is strongly orange colored, contains a different product, also an indicator, acid color orange, alkaline color bright blue. It probably is the isomeric ortho azo product, that is, 2-(2,4-dinitro-6-sulfonic-phenyl azo)-1-naphthol-6,8-disulfonic acid.

EXAMPLE 5

Use of a molar equivalent of ethylamine or benzylamine in place of methylamine in Example 3 yields 1-naphthol-8-N-ethylsulfamido-6-sulfonic acid and 1-naphthol-8-N-benzyl-sulfamido-6-sulfonic acid respectively; and ultimately the sodium salt of 4-(2,4-dinitro-6-sulfonic phenyl azo)-1-naphthol-8-(N-ethyl sulfonamido)-6-sulfonic acid and of 4-(2,4-dinitro-6-sulfonic phenyl azo)-1-naphthol-8-(N-benzyl sulfonamido)-6-sulfonic acid are produced.

The latter products, like the N-methyl compound have the following pH range: pH 7, blue; pH 6, blue; pH 5, dark green; pH 4, yellow.

The invention may be variously otherwise embodied within the scope of the appended claims.

What is claimed is:

1. Compounds of the class consisting of:

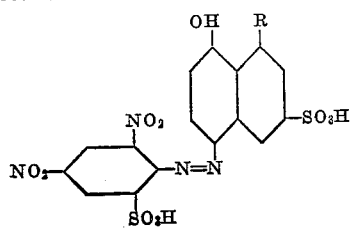

wherein R is a member of the class consisting of sulfonic, sulfonamide, N-(lower alkyl)-substituted sulfonamide, N-(benzyl) substituted sulfonamide groups and alkali salts thereof.

2. An alkali metal salt of 4-(2,4-dinitro-6-sulfonic-phenylazo)-1-naphthol-6,8-disulfonic acid.

3. An alkali metal salt of 4-(2,4-dinitro-6-sulfonic-phenylazo)-1-naphthol-8-sulfonamido-6-sulfonic acid.

4. An alkali metal salt of 4-(2,4-dinitro-6-sulfonic-phenylazo)-1-naphthol-8-N-(methyl)sulfonamido - 6 - sulfonic acid.

5. 4-(2,4-dinitro-6-sulfonic-phenylazo)-1-naphthol - 6,8-disulfonic acid, potassium salt.

6. 4-(2,4-dinitro-6-sulfonic-phenylazo)-1-naphthol - 6,8-disulfonic acid, sodium salt.

7. 4-(2,4-dinitro-6-sulfonic-phenylazo)-1-naphthol - 8 - sulfonamido-6-sulfonic acid, potassium salt.

8. 4-(2,4-dinitro-6-sulfonic-phenylazo)-1-naphthol - 8 - (N-methyl-sulfonamido)-6-sulfonic acid, sodium salt.

References Cited in the file of this patent

UNITED STATES PATENTS

| | | |
|---|---|---|
| 617,963 | Kirchhoff | Jan. 17, 1899 |
| 978,865 | Ernest et al. | Dec. 20, 1910 |
| 1,975,340 | Wenker | Oct. 2, 1934 |